United States Patent
Nonobe

(10) Patent No.: US 6,524,733 B1
(45) Date of Patent: Feb. 25, 2003

(54) FUEL CELL SYSTEM WITH HUMIDITY DETERMINATION

(75) Inventor: Yasuhiro Nonobe, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/511,926

(22) Filed: Feb. 23, 2000

(30) Foreign Application Priority Data

Feb. 23, 1999 (JP) .................................... 11-044200 (P)

(51) Int. Cl.$^7$ ................................................ H01M 8/04
(52) U.S. Cl. ........................ 429/23; 429/17; 429/22; 429/30; 429/38; 429/7; 429/12
(58) Field of Search .............................. 429/7, 12, 17, 429/22, 23, 30, 38

(56) References Cited

U.S. PATENT DOCUMENTS 5,939,218 A * 8/1999 Mizuno ........................ 429/23

FOREIGN PATENT DOCUMENTS

| EP | 0716463 A | * | 6/1996 | ............ H01M/8/24 |
|----|-----------|---|--------|----------------------|
| EP | 0716463 A2 | * | 6/1996 | ............ H01M/8/04 |
| JP | 7-272736 | | 10/1995 | |
| JP | 8-88012 | | 4/1996 | |
| JP | 408167421 | * | 6/1996 | ............ H01M/8/04 |
| JP | 9-306531 | | 11/1997 | |
| JP | 411162490 A | * | 6/1999 | ............ H01M/8/04 |
| JP | 11-191423 | * | 7/1999 | ............ H01M/8/04 |

* cited by examiner

Primary Examiner—Stephen Kalafut
Assistant Examiner—Angela J Martin
(74) Attorney, Agent, or Firm—Oblon, Spivak, McClelland, Maier & Neustadt, P.C.

(57) ABSTRACT

In a polymer electrolyte fuel cell system, a condition of humidification of electrolyte membranes is precisely determined, and adjustment is performed so that the condition of humidification of the electrolyte membranes substantially remains within a proper range. The system determines a condition of humidification of the electrolyte membranes of the fuel cell based on a differential value of the resistance of the fuel cell detected by a resistance detector when the electric current outputted by the fuel cell equals a predetermined value. The current from the cell is detected by an ammeter. The fuel cell is formed by stacking electrically conductive electrodes and separators, and proton-conductive electrolyte membranes. The electric conductivity of the electrodes and the separators is not affected by the humidification condition thereof, whereas the proton-conductivity of the electrolyte membranes greatly changes depending on the condition of humidification thereof. Therefore, the changing rate of the resistance of the fuel cell directly represents the changing rate of the proton-conductivity of the electrolyte membranes, so that the humidification condition of the electrolyte membranes can be precisely determined.

14 Claims, 7 Drawing Sheets

FUEL CELL SYSTEM WITH HUMIDITY DETERMINATION

The disclosure of Japanese Patent Application No. HEI 11-44200 filed on Feb. 23, 1999 including the specification, drawings and abstract is incorporated herein by reference in its entirety.

BACKGROUND OF THE INVENTION

1. Field of the Invention

The present invention relates to a fuel cell system and, more particularly, to a fuel cell system having a polymer electrolyte fuel cell formed by stacking unit cells, each of which has an electrolyte membrane and two electrodes sandwiching the electrolyte membrane.

2. Description of the Related Art

A fuel cell system that determines, based on the humidity in a polymer electrolyte fuel cell and the voltage outputted by the fuel cell, whether the amount of moisture or water contained in electrolyte membranes is insufficient, and a fuel cell system that determines whether the amount of water contained in electrolyte membranes of a fuel cell is sufficient based on an electric current threshold derived by using the amount of change in voltage and temperature as parameters, and on the current outputted by the fuel cell (described in, for example, Japanese Patent Application Laid-Open No. HEI 7-272736) have been proposed. These systems derive an allowable minimum voltage, as a threshold, corresponding to a detected reaction temperature of the fuel cell by using a table that indicates a relationship between the allowable minimum voltage outputted from the fuel cell and the reaction temperature of the fuel cells. If the voltage outputted from the fuel cell is less than the threshold, it is determined that the amount of electrolyte membrane-contained water is insufficient. The systems also derive a maximum electric current value as a threshold by using the amount of change in the voltage outputted from the fuel cell and the temperature of the fuel cells as parameters. If the current outputted from the fuel cell is greater than the threshold, it is determined that the amount of electrolyte membrane-contained water is insufficient. When it is determined that the amount of electrolyte membrane-contained water is insufficient, the systems limit the current supplied to loads.

However, the above-described fuel cell systems have a drawback of reduced precisions in determining the amount of electrolyte membrane-contained water because the amount of electrolyte membrane-contained water considerably changes depending on the fuel cell temperature, the fuel gas pressure, the amount of fuel gas supplied, and the like. Furthermore, when it is determined that the amount of electrolyte membrane-contained water is insufficient, the systems limit the current supplied to loads, so as to protect the electrolyte membranes from damage. However, it is difficult to achieve an appropriate range of the amount of electrolyte membrane-contained water in the systems.

SUMMARY OF THE INVENTION

Accordingly, it is an object of the invention to precisely determine a condition of humidification of electrolyte membranes in a fuel cell system. It is another object to perform adjustment such that the condition of humidification remains within a proper range. It is still another object to determine that there is an abnormality in a fuel cell system if the condition of humidification of electrolyte membranes cannot be adjusted to a proper range and to protect the electrolyte membranes from damage when it is determined that there is an abnormality.

To achieve at least one of the aforementioned and other objects of the invention, one aspect of the invention provides a fuel cell system having a polymer electrolyte type fuel cell formed by stacking unit cells, each of which has an electrolyte membrane sandwiched by two electrodes, the system including a fuel gas supplier that supplies a fuel gas to the fuel cell, a fuel gas humidifier that humidifies the fuel gas, a current detector that detects an electric current outputted from the fuel cell, a resistance detector that detects a resistance of the fuel cell, and a humidification condition determiner that determines a condition of humidification of the electrolyte membranes based on the current detected by the current detector and the resistance detected by the resistance detector.

This fuel cell system determines a condition of humidification of the electrolyte membranes based on the current outputted by the fuel cell and the electrical resistance of the fuel cell, which is directly determined by the condition of humidification of the electrolyte membranes. Therefore, the system provides precise determination regarding the condition of humidification of the electrolyte membranes.

Another aspect of the invention provides a fuel cell system having a polymer electrolyte type fuel cell formed by stacking unit cells, each of which has an electrolyte membrane sandwiched by two electrodes, the system including a fuel gas supplier that supplies a fuel gas to the fuel cell, a fuel gas humidifier that humidifies the fuel gas, a current detector that detects an electric current outputted from the fuel cell, a voltage detector that detects a voltage outputted from the fuel cell, a fuel gas supply changer that changes an amount of the fuel gas supplied to the fuel cell, a humidification condition determiner that determines a condition of humidification of the electrolyte membranes based on the current and the voltage detected by the current detector and the voltage detector, respectively, when the amount of the fuel gas supplied is changed by the fuel gas supply changer.

This fuel cell system determines a condition of humidification of the electrolyte membranes based on the current, the voltage, and the amount of the fuel gas supplied to the fuel cell, which is a factor that affects the condition of humidification of the electrolyte membranes. Therefore, the system provides precise determination regarding the condition of humidification of the electrolyte membranes.

Still another aspect of the invention provides a fuel cell system having a polymer electrolyte type fuel cell formed by stacking unit cells, each of which has an electrolyte membrane sandwiched by two electrodes, the system including a fuel gas supplier that supplies a fuel gas to the fuel cell, a fuel gas humidifier that humidifies the fuel gas, a voltage detector that detects a voltage outputted from the fuel cell, a fuel gas supply changer that changes an amount of the fuel gas supplied to the fuel cell, and a humidification condition determiner that determines a condition of humidification of the electrolyte membranes based on a first voltage detected by the voltage detector before the amount of the fuel gas supplied is changed by the fuel gas supply changer and a second voltage detected by the voltage detector after the amount of the fuel gas supplied is changed by the fuel gas supply changer.

This fuel cell system determines a condition of humidification of the electrolyte membranes based on the voltage and the amount of the fuel gas supplied to the fuel cell, which is a factor that affects the condition of humidification of the electrolyte membranes. Therefore, the system provides precise determination regarding the condition of humidification of the electrolyte membranes.

A further aspect of the invention provides a fuel cell system having a polymer electrolyte type fuel cell formed by stacking unit cells, each of which has an electrolyte membrane sandwiched by two electrodes, the system including a fuel gas supplier that supplies a fuel gas to the fuel cell, a fuel gas humidifier that humidifies the fuel gas, a voltage detector that detects a voltage outputted from the fuel cell, a fuel gas supply changer that changes an amount of the fuel gas supplied to the fuel cell, a humidification condition determiner that determines a condition of humidification of the electrolyte membranes based on a first variation of voltages detected by the voltage detector before the amount of the fuel gas supplied is changed by the fuel gas supply changer and a second variation of voltages detected by the voltage detector after the amount of the fuel gas supplied is changed by the fuel gas supply changer.

In this fuel cell system, the voltage detector may detect a voltage of each unit cell of the fuel cell, or may detect a voltage of each module that has at least two of the unit cells. A change in the amount of the fuel gas supplied to the fuel cell affects the condition of humidification of the electrolyte membranes. When the condition of humidification of the electrolyte membranes changes, the change appears in the variation (e.g., variance) of the voltages of the individual unit cells or the individual fuel cell modules.

Therefore, by determining a condition of humidification of the electrolyte membranes based on the voltages of the unit cells or the fuel cell modules, which reflects the condition of humidification of the electrolyte membranes, the system is able to provide precise determination regarding the condition of humidification of the electrolyte membranes.

In the above-described aspects of the invention, a degree of humidification in the fuel gas may be controlled based on the determination made by the humidification condition determiner. In this manner, the condition of humidification of the electrolyte membranes can be adjusted.

Furthermore, an abnormality of the fuel cell system may be detected if the condition of humidification of the electrolyte membranes does not change despite the control of the condition of humidification performed for a predetermined amount of time. In order to provide notification of the occurrence of an abnormality, information regarding the abnormality may be outputted. The operation of the fuel cell system may also be stopped upon detection of an abnormality. Therefore, it becomes possible to protect the fuel cell from damage or the like that can possibly occur during operation in the presence of an abnormality.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENTS

A preferred embodiment of the invention will be described hereinafter with reference to the accompanying drawings.

Figure 1:
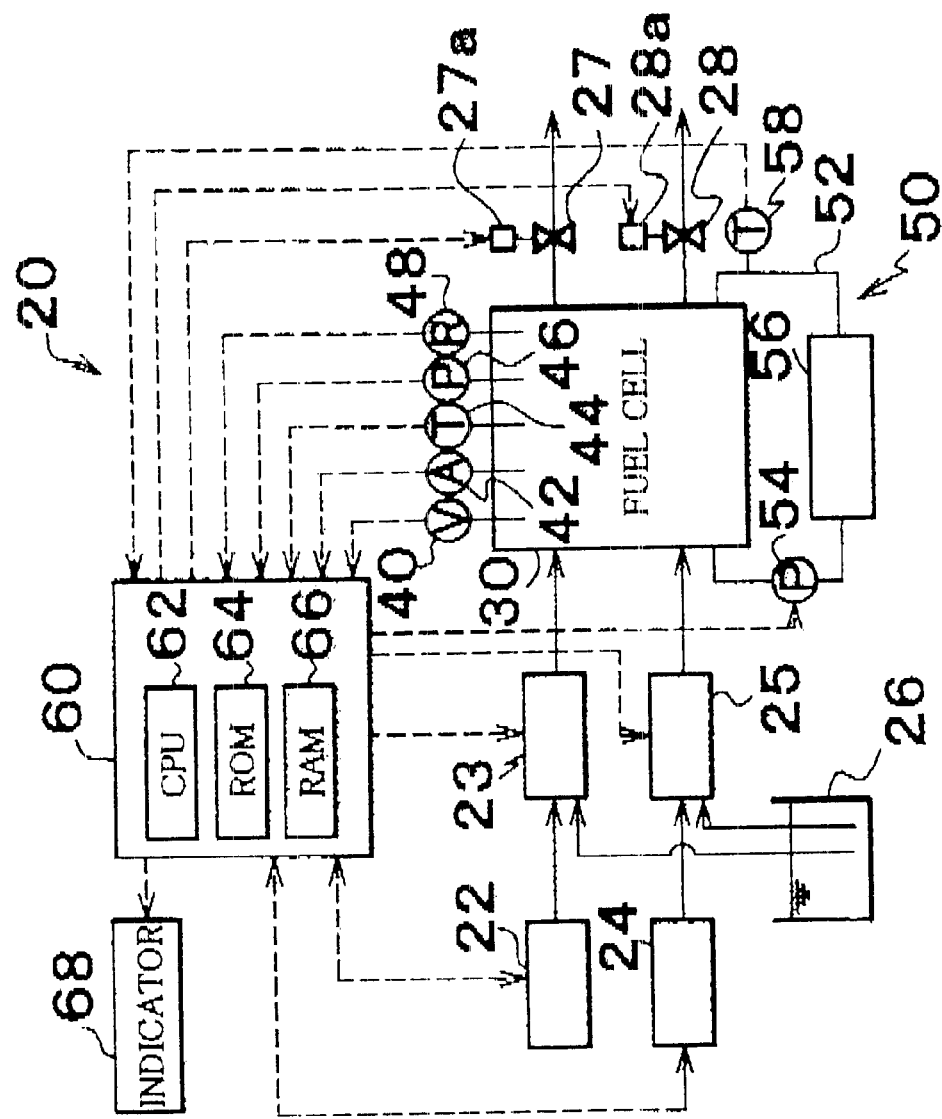
FIG. 1 is a schematic illustration of a construction of fuel cell system according to the invention.

FIG. 1 is a schematic illustration of a construction of a fuel cell system according to the invention. A fuel cell system 20 has a polymer electrolyte fuel cell 30 that generates electric power when supplied with a fuel gas and an oxidative gas, a fuel gas supplier device 22 for supplying the fuel gas containing hydrogen to the fuel cell 30, a fuel gas humidifier 23 for humidifying the fuel gas, an oxidative gas supplier device 24 for supplying the oxidative gas containing oxygen (e.g., air) to the fuel cell 30, an oxidative gas humidifier 25 for humidifying the oxidative gas, a cooling device 50 for cooling the fuel cell 30, and an electronic control unit 60 for controlling the operation of the fuel cell system 20.

The fuel gas supplier device 22 may be, for example, a reformer that reforms a hydrocarbon fuel, such as methanol, methane or the like, into a hydrogen-rich fuel gas and supplies the hydrogen-rich fuel gas to the fuel cell 30, or a fuel gas storage tank that stores a hydrogen-containing fuel gas. The oxidative gas supplier device 24 may be an air pump that simply supplies air, or an oxidative gas storage tank that stores an oxidative gas other than air. The fuel gas supplier device 22 and the oxidative gas supplier device 24 are connected to the electronic control unit 60 by signal lines, so that the electronic control unit 60 controls the amount of fuel gas supplied and the amount of oxidative gas supplied.

The fuel gas humidifier 23 and the oxidative gas humidifier 25 vaporize water pumped from a water tank 26 and supply water vapor to the fuel gas and the oxidative gas. The fuel gas humidifier 23 and the oxidative gas humidifier 25 are connected to the electronic control unit 60 by signal lines, so that the electronic control unit 60 controls the amount of moisture or the degree of humidification in the fuel gas and the amount of moisture or the degree of humidification in the oxidative gas.

Figure 2:
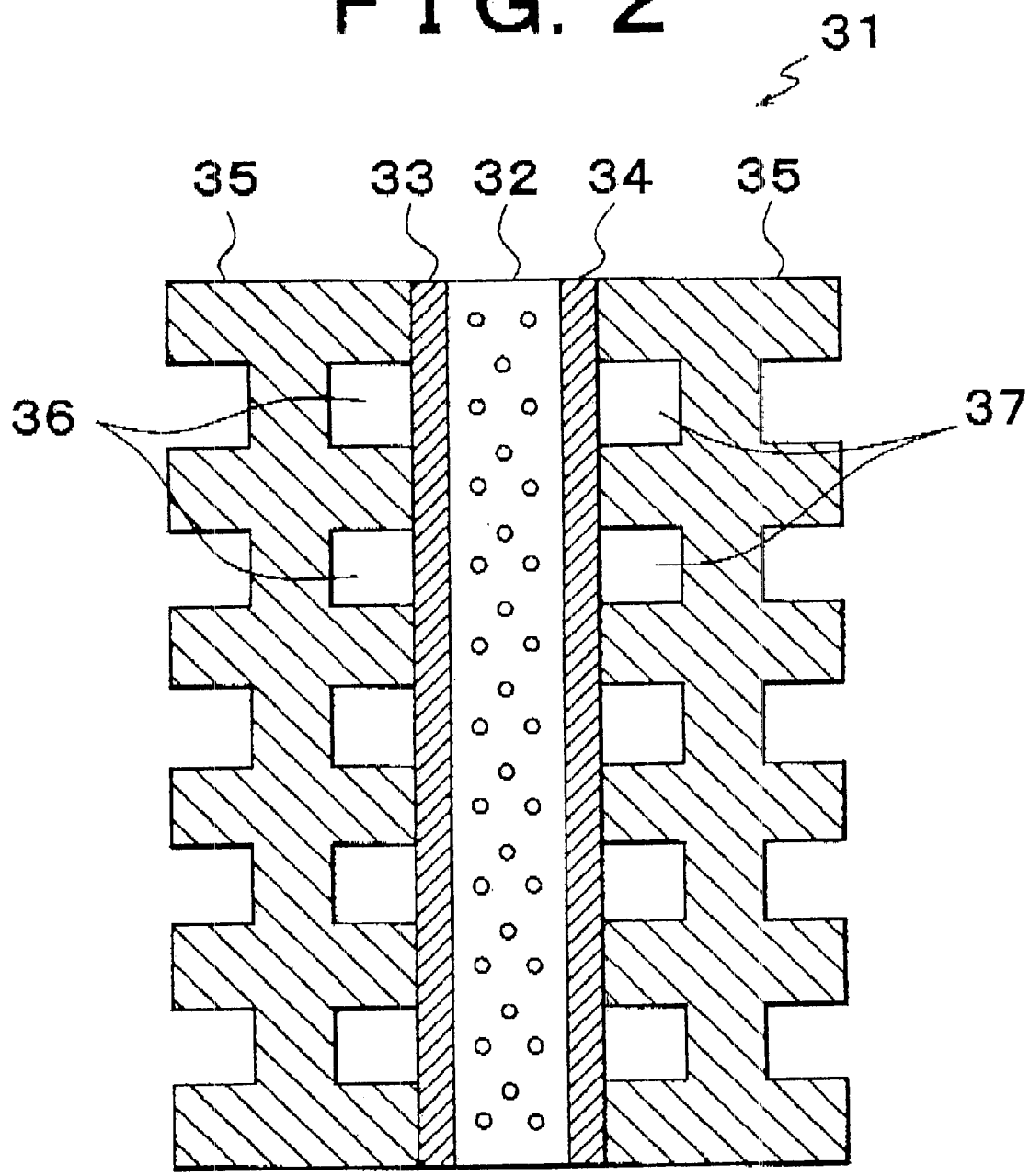
FIG. 2 is a schematic illustration of a construction of a unit cell of a fuel cell.

The fuel cell 30 is a polymer electrolyte fuel cell formed by stacking a plurality of unit cells 31. FIG. 2 is a schematic illustration of a unit cell 31 of the fuel cell 30. As shown in FIG. 2, a unit cell 31 has an electrolyte membrane 32 that is a proton-conductive membrane formed from a polymer material such as fluorocarbon resin or the like, and an anode 33 and a cathode 34 which are gas diffusion electrodes formed by a carbon cloth carrying a platinum catalyst or an alloy catalyst formed by platinum and one or more other metals. The anode 33 and the cathode 34 sandwich the electrolyte membrane 32 so that the electrolyte membrane 32 is held by catalyst-carrying side faces of the anode 33 and the cathode 34. The unit cell 31 further includes two separators 35 disposed on opposite sides of the above-described sandwich structure. Together with anode 33 and the cathode 34, the separators 35 define channels 36, 37 for the fuel gas and the oxidative gas. The separators 35 also serve as partitions between adjacent unit cells 31.

The fuel cell 30 is equipped with a voltmeter 40 and an ammeter 42 for detecting the voltage V and the current I outputted from the fuel cell 30, a fuel cell temperature sensor 44 for detecting the temperature of the fuel cell 30, a pressure sensor 46 for detecting the gas pressure P of the fuel gas and the oxidative gas, a resistance detector 48 for detecting the electrical resistance of the fuel cell 30, and the like. These sensors and the like are connected to the electronic control unit 60 by signal lines. An example of the method for detecting the resistance of the fuel cell 30 is one in which the resistance of the fuel cell 30 is determined from a value of current from the fuel cell 30 occurring when an AC voltage is applied to an output terminal of the fuel cell 30. The resistance of the fuel cell 30 can be roughly divided into the resistances of the anodes 33, the cathodes 34 and the separators 35, and the resistance based on the proton conductivity of the electrolyte membranes 32. The resistances of the anodes 33, the cathodes 34 and the separators 35 remain unchanged regardless of whether the components are humidified, because the anodes 33, the cathodes 34 and the separators 35 are formed from electrically conductive materials. In contrast, the proton conductivity of the electrolyte membranes 32 remarkably changes depending on whether the electrolyte membranes 32 are wet. Therefore, the value of resistance of the fuel cell 30 reflects the degree of wetness of the electrolyte membranes 32.

Fuel gas and oxidative gas discharge pipes of the fuel cell 30 are provided with pressure-regulating valves 27, 28, so that the fuel gas pressure and the oxidative gas pressure in the fuel cell 30 can be adjusted. Actuators 27a, 28a of the pressure-regulating valves 27, 28 are connected to the electronic control unit 60 by signal lines, so that the actuators 27a, 28a are driven and controlled by the electronic control unit 60.

The cooling device 50 has a cooling plate disposed inside the fuel cell 30, a cooling water channel 52 that forms a cooling water passage formed in the cooling plate and a circulation channel, a heat exchanger 56 disposed in the cooling water channel 52 for cooling the cooling water through heat exchange with the external air, a cooling water pump 54 for circulating the cooling water through the circulation channel, and a cooling water temperature sensor 58 for detecting the temperature of the cooling water near an outlet opening of the fuel cell 30. The cooling water pump 54 and the cooling water temperature sensor 58 are connected to the electronic control unit 60 by signal lines, so that the electronic control unit 60 controls the cooling of the fuel cell 30. That is, based on the cooling water temperature detected by the cooling water temperature sensor 58, the electronic control unit 60 drives the cooling water pump 54 so as to control the flow of circulating cooling water.

The electronic control unit 60 is formed as a one-chip microprocessor having a CPU 62 as a main component. The electronic control unit 60 further has a ROM 64 storing processing programs, a RAM 66 for temporarily storing data, and input and output ports (not shown). The temperatures and flows of fuel gas and oxidative gas supplied from the fuel gas supplier device 22 and the oxidative gas supplier device 24 are inputted to the electronic control unit 60 from thermometers (not shown) and flowmeters (not shown) via input ports. The electronic control unit 60 further receives information regarding the operational conditions of the fuel gas humidifier 23 and the oxidative gas supplier device 24, the voltage V from the voltmeter 40, the current I from the ammeter 42, the temperature from the fuel cell temperature sensor 44, the gas pressure P from the pressure sensor 46, the value of resistance from the resistance detector 48, the temperature from the cooling water temperature sensor 58, and the like via input ports. The electronic control unit 60 outputs drive signals to the fuel gas supplier device 22, the oxidative gas supplier device 24, the fuel gas humidifier 23, the oxidative gas humidifier 25 and the cooling water pump 54, and outputs a lighting signal to an indicator lamp 68, and the like, via output ports.

Figure 3:
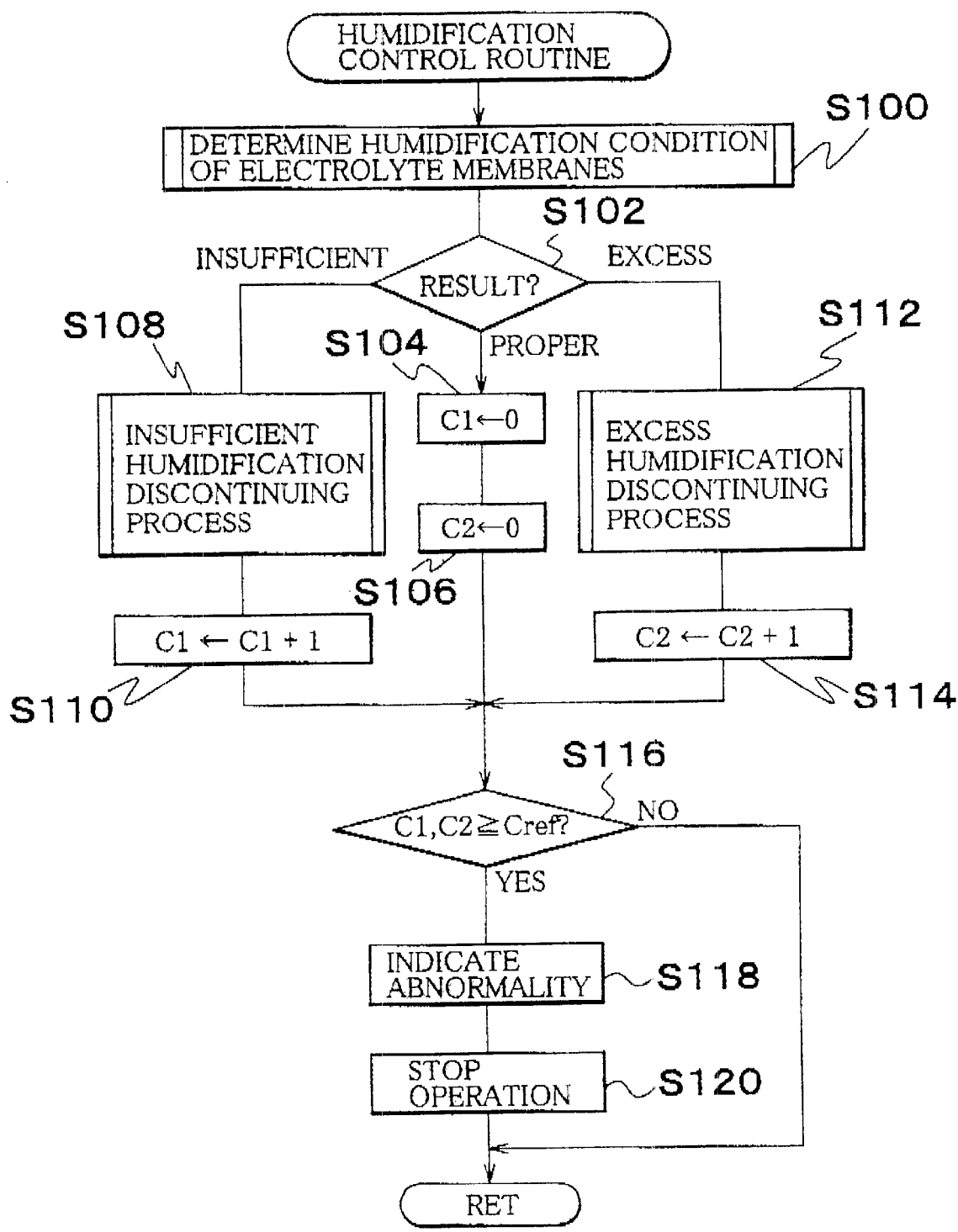
FIG. 3 is a flowchart illustrating a humidification control routine.

The operation of the fuel cell system 20 constructed as described above and, in particular, the control of humidification of the fuel cell 30, will be described. FIG. 3 is a flowchart illustrating a humidification control routine executed by the electronic control unit 60 of the fuel cell system 20. This routine is executed at every predetermined time during a period that starts immediately after the operation of the fuel cell system 20 is started and that ends when the operation of the fuel cell system 20 is stopped.

When the humidification control routine is started, the CPU 62 executes a process of determining a condition of humidification of the electrolyte membranes 32. The determining process of step S100 is performed by a humidification condition determining routine (described in detail later) as illustrated in any of FIGS. 4 through 7. The determining routine outputs one of three results, that is, "proper humidification", "insufficient humidification", and "excess humidification".

If the determination made by the humidification condition determining process of step S100 is "proper humidification", the CPU 62 resets a counter C1 and a counter C2 in steps S104 and S106. If the determination is "insufficient humidification", the CPU 62 executes a process for discontinuing the insufficient humidification of the electrolyte membranes 32 in step S108, and increments the counter C1 in step S110.

Examples of the process for discontinuing insufficient humidification of the electrolyte membranes 32 include:

(A1) a process of increasing the degrees of humidification in the fuel gas and the oxidative gas by using the fuel gas humidifier 23 and the oxidative gas humidifier 25;

(A2) a process of raising the gas pressures P of the fuel gas and the oxidative gas in the fuel cell 30 by closing the pressure regulating valves 27, 28;

(A3) a process of lowering the operating temperature of the fuel cell 30 by increasing the flow of cooling water circulated by the cooling water pump 54 of the cooling device 50; and (A4) a process of reducing the amounts of the fuel gas and the oxidative gas supplied to the fuel cell 30 from the fuel gas supplier device 22 and the oxidative gas supplier device 24.

The process (A1) directly discontinues insufficient humidification of the electrolyte membranes 32 by increasing the degrees of humidification in the fuel gas and the oxidative gas. The process (A2) discontinues insufficient humidification of the electrolyte membranes 32 on the basis of a fact that increased gas pressures increase the water vapor pressure in the fuel gas and the oxidative gas. The process (A3) discontinues insufficient humidification of the electrolyte membranes 32 on the basis of a fact that a lowered operating temperature of the fuel cell 30 lowers the fuel gas temperature and the oxidative gas temperature and, therefore, the water vapor pressures in the fuel gas and the oxidative gas increase. The process (A4) discontinues insufficient humidification of the electrolyte membranes 32 on the basis of a fact that reduced amounts of the fuel gas and the oxidative gas supplied reduce water evaporation from the electrolyte membranes 32. From such various processes for discontinuing insufficient humidification of the electrolyte membranes 32, either a single process or a combination of two or more processes may be adopted. It is also possible to sequentially change the process or processes to be performed for every execution cycle of the humidification control routine.

If the humidification condition determined in step S102 is "excess humidification", the CPU 62 executes a process for discontinuing excess humidification of the electrolyte membranes 32 in step S112, and increments the counter C2 in step S114.

Examples of the process for discontinuing excess humidification of the electrolyte membranes 32 include:

(B1) a process of reducing the degrees of humidification in the fuel gas and the oxidative gas by using the fuel gas humidifier 23 and the oxidative gas humidifier 25;

(B2) a process of lowering the gas pressures P of the fuel gas and the oxidative gas in the fuel cell 30 by opening the pressure regulating valves 27, 28;

(B3) a process of raising the operating temperature of the fuel cell 30 by decreasing the flow of cooling water circulated by the cooling water pump 54 of the cooling device 50; and (B4) a process of increasing the amounts of the fuel gas and the oxidative gas supplied to the fuel cell 30 from the fuel gas supplier device 22 and the oxidative gas supplier device 24.

The process (B1) directly discontinues excess humidification of the electrolyte membranes 32 by decreasing the degrees of humidification in the fuel gas and the oxidative gas. The process (B2) discontinues excess humidification of the electrolyte membranes 32 on the basis of a fact that decreased gas pressures decrease the water vapor pressures in the fuel gas and the oxidative gas. The process (B3) discontinues excess humidification of the electrolyte membranes 32 on the basis of a fact that a raised operating temperature of the fuel cell 30 raises the fuel gas temperature and the oxidative gas temperature and, therefore, the water vapor pressures in the fuel gas and the oxidative gas decrease. The process (B4) discontinues excess humidification of the electrolyte membranes 32 on the basis of a fact that increased amounts of the fuel gas and the oxidative gas supplied accelerate water evaporation from the electrolyte membranes 32. From such various processes for discontinuing excess humidification of the electrolyte membranes 32, either a single process or a combination of two or more processes maybe adopted. It is also possible to sequentially change the process or processes to be performed for every execution cycle of the humidification control routine.

The count of the counter C1 is incremented when the process for discontinuing insufficient humidification of the electrolyte membranes 32 has been sequentially performed. Likewise, the counter C2 indicates the number of times that the process for discontinuing excess humidification has been performed sequentially.

After incrementing the count C1 or C2 subsequently to the process for discontinuing insufficient humidification or excess humidification corresponding to the result of determination regarding the humidification condition of the electrolyte membranes 32, the CPU 62 compares the count C1, C2 with a predetermined time threshold Cref in step S116. The threshold Cref is preset on the basis of the number of times of executing the process or the amount of time that is needed in order to consider that the process for discontinuing insufficient or excess humidification of the electrolyte membranes 32 has been sufficiently performed. Therefore, if the count C1 or C2 is equal to or greater than the threshold Cref, the CPU 62 determines that an abnormality has occurred in the fuel cell system 20, and turns on the indicator lamp 68 to inform an operating person of the abnormality in step S118. Subsequently in step S120, the CPU 62 stops the operation of the fuel cell system 20 in order to protect the fuel cell 30 and the like. This routine then ends. Conversely, if both the counts C1, C2 are less than the threshold Cref, the CPU 62 determines that there is no abnormality in the fuel cell system 20, and then ends the routine.

As is apparent from the above description, the fuel cell system 20 according to the invention is able to control the condition of humidification of the electrolyte membranes 32 on the basis of the result of determination regarding the condition of humidification of the electrolyte membranes 32, by executing the humidification control routine illustrated in FIG. 3. For example, insufficient humidification or excess humidification of the electrolyte membranes 32 can be discontinued by any one or more of the processes (A1)–(A4) or the processes (B1)–(B4).

Furthermore, by executing the humidification control routine illustrated in FIG. 3, the fuel cell system 20 is able to determine that an abnormality has occurred in the system if insufficient humidification or excess humidification is not discontinued despite repeated performance of the process for discontinuing insufficient or excess humidification of the electrolyte membranes 32. In such a case, the fuel cell system 20 informs an operating person of the occurrence of an abnormality and stops the operation of the fuel cell system 20. Therefore, the fuel cell system 20 makes it possible for an operating person to quickly realize occurrence of an abnormality and is able to prevent, for example, damage to the fuel cell system 20 that can be caused if the operation of the fuel cell system 20 is continued in the presence of an abnormality The processing of step S100 in FIG. 3, that is, the process of determining a condition of humidification of the electrolyte membranes 32, will now be described. FIGS. 4 to 7 are flowcharts illustrating examples of a humidification condition determining routine that determines a condition of humidification of the electrolyte membranes 32. Any one or more of the four humidification condition determining routines may be executed in step S100 in FIG. 3. It is also possible to sequentially change the process or processes to be performed for every execution cycle of the humidification control routine illustrated in FIG. 3.

The humidification condition determining routines illustrated in FIGS. 4 to 7 will be individually described below.

Figure 4:
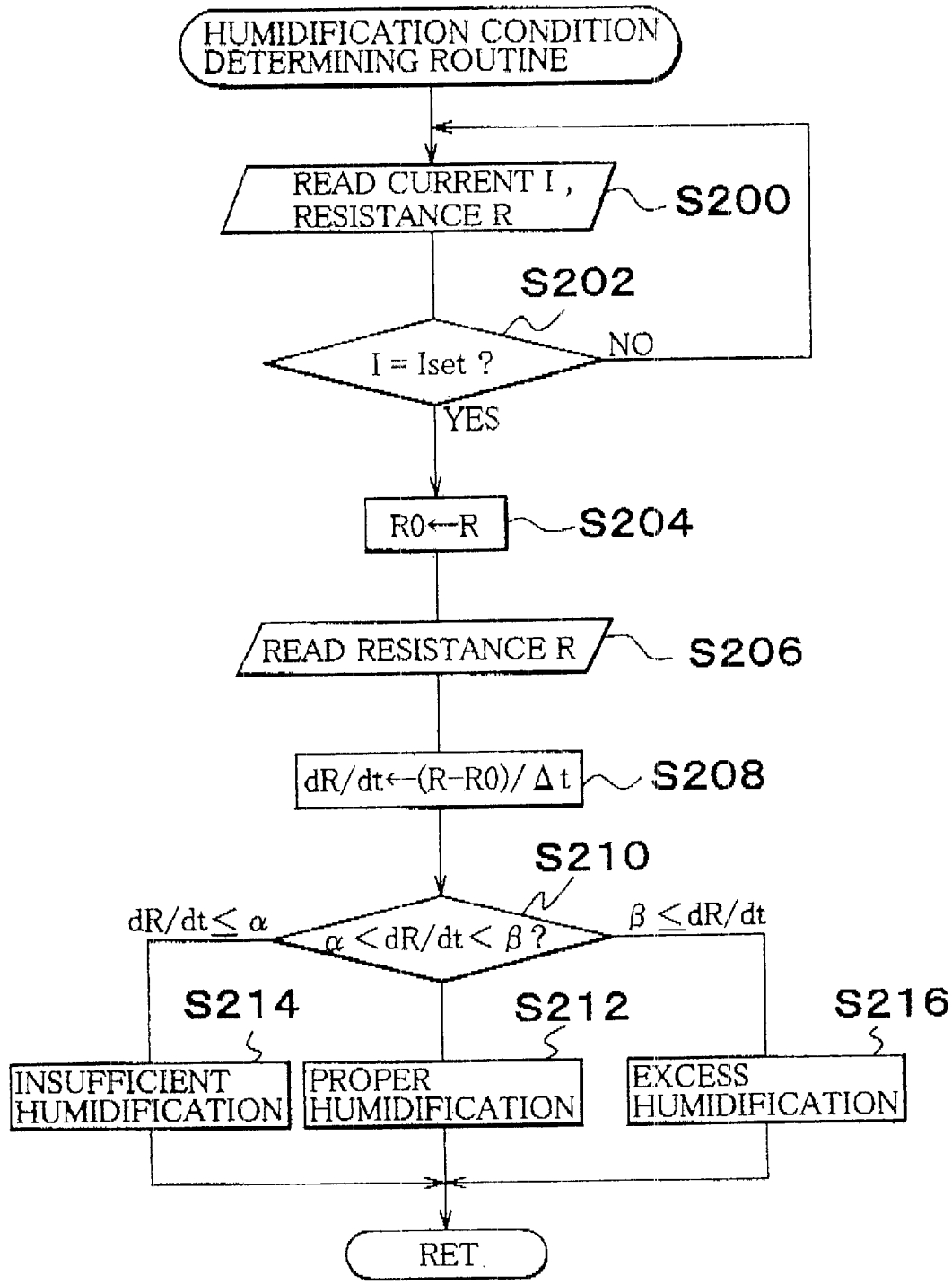
FIG. 4 is a flowchart illustrating a humidification condition determining routine.

When the humidification condition determining routine illustrated in FIG. 4 is started, the CPU 62 reads, in step S200, an output current I of the fuel cell 30 detected by the ammeter 42, and a resistance R of the fuel cell 30 detected by the resistance detector 48. Subsequently in step S202, the CPU 62 compares the current I with a predetermined current Iset. If the current I does not equal the predetermined current Iset, the CPU 62 returns to step S200. The predetermined current Iset is preset to an ordinary current value that is not particularly great nor small. Therefore, the current I outputted from the fuel cell 30 frequently equals the predetermined current Iset.

When the current I equals the predetermined current Iset, the CPU 62 substitutes the resistance R detected in step S200 for the previous resistance R0 in step S204. Subsequently in step S206, the CPU 62 reads a resistance R of the fuel cell 30 detected by the resistance detector 48. In step S208, the CPU 62 sets, as a differential value dR/dt, a value obtained by dividing the difference of the presently read resistance R from the previous resistance R0 by an infinitesimal time $\Delta t$. The infinitesimal time $\Delta t$ is set as a time consumed between the reading of the resistance R performed in step S200 when the current I equals the predetermined current Iset and the reading of the resistance R in step S206. The infinitesimal time Δt is determined in accordance with the performance of the CPU 62 of the electronic control unit 60, and the contents of the processings that are parallelly executed by the CPU 62, and the like.

After the calculation in step S208, the CPU 62 determines in step S210 whether the differential value dR/dt is within a proper humidification range set between a predetermined resistance differential threshold a and a predetermined resistance differential threshold β. When the humidification of the electrolyte membranes 32 is insufficient, the proton conductivity of the electrolyte membranes 32 decreases, so that the response to small changes of the humidification condition of the electrolyte membranes 32 becomes dull and, therefore, the differential value dR/dt becomes small. Conversely, when the humidification of the electrolyte membranes 32 is excessive, the proton conductivity of the electrolyte membranes 32 increases, so that the response to changes of the humidification condition of the electrolyte membranes 32 is quick even if such a change is small and, therefore, the differential value dR/dt becomes great. Therefore, the humidification condition of the electrolyte membranes 32 can be determined by determining a differential value dR/dt when the condition of humidification of the electrolyte membranes 32 is within the proper range, and setting a proper humidification range through the use of the threshold a and the threshold β as a lower limit and an upper limit, respectively, and comparing the calculated differential value dR/dt with the proper humidification range.

When the differential value dR/dt is within the proper humidification range, the CPU 62 determines in step S212 that the humidification of the electrolyte membranes 32 is proper (proper humidification) When the differential value dR/dt is equal to or less than the threshold a, the CPU 62 determines in step S214 that the humidification of the electrolyte membranes 32 is insufficient (insufficient humidification). When the differential value dR/dt is equal to or greater than the threshold β, the CPU 62 determines in step S216 that the humidification of the electrolyte membranes 32 is excessive (excess humidification). This routine then ends.

By executing the humidification condition determining routine illustrated in FIG. 4, the fuel cell system 20 is able to determine a humidification condition of the electrolyte membranes 32 based on the current I outputted from the fuel cell 30 and the resistance R of the fuel cell 30. Furthermore, since the resistance R of the fuel cell 30 directly reflects the humidification condition of the electrolyte membranes 32, the humidification condition of the electrolyte membranes 32 can be more accurately determined.

Figure 5:
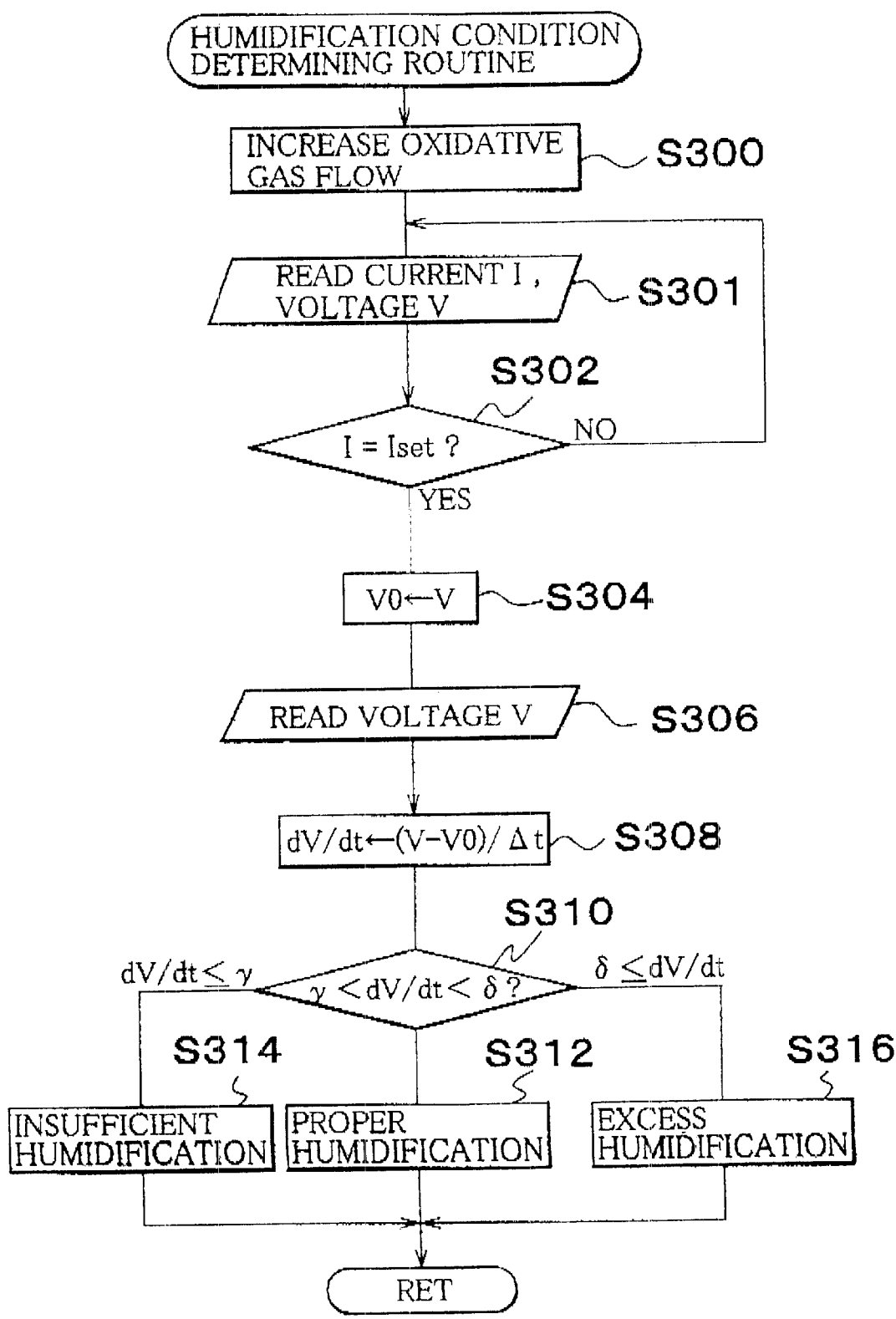
FIG. 5 is a flowchart illustrating another humidification condition determining routine.

Next described will be a humidification condition determining routine illustrated in FIG. 5. When this routine is started, the CPU 62 first increases the amount of oxidative gas supplied from the oxidative gas supplier device 24 to the fuel cell 30 in step S300. Subsequently, the CPU 62 repeats the sequence of step S301 of reading the current I detected by the ammeter 42 and the voltage V detected by the voltmeter 40 and step S302 of comparing the read current I with a predetermined current Iset, until the detected current I equals the predetermined current Iset. The predetermined current Iset is the same as the predetermined current Iset used in the humidification condition determining routine illustrated in FIG. 4.

When the detected current I equals the predetermined current Iset, the CPU 62 substitutes the voltage V detected in step S301 for the previous voltage V0 in step S304. Subsequently in step S306, the CPU 62 reads a voltage V detected by the voltmeter 40. In step S308, the CPU 62 sets, as a differential value dV/dt, a value obtained by dividing the difference of the presently read voltage V from the previous voltage V0 by an infinitesimal time Δt. The infinitesimal time Δt is set as a time consumed between the reading of the voltage V performed in step S301 when the current I equals the predetermined current Iset and the reading of the voltage V in step S306 as in the routine illustrated in FIG. 4.

After determining the differential value dV/dt, the CPU 62 determines in step S310 whether the differential value dV/dt is within a proper humidification range set between a threshold γ and a threshold δ. When the amount of oxidative gas supplied is increased in step S300, the water evaporation from the electrolyte membranes 32 is accelerated. When the humidification of the electrolyte membranes 32 is insufficient, the proton conductivity of the electrolyte membranes 32 does not significantly change even if the water evaporation from the electrolyte membranes 32 is accelerated to bring about further insufficient humidification. In that case, therefore, the differential value dV/dt becomes small. Conversely, when the humidification of the electrolyte membranes 32 is excessive, acceleration of the water evaporation from the electrolyte membranes 32 brings the condition closer to proper humidification, so that the proton conductivity of the electrolyte membranes 32 increases. In that case, therefore, the differential value dV/dt becomes great. Therefore, the humidification condition of the electrolyte membranes 32 can be determined by determining a differential value dV/dt when the humidification condition of the electrolyte membranes 32 is within the proper range, and setting a proper humidification range through the use of the threshold γ and the threshold 6 as a lower limit and an upper limit, respectively, and comparing the calculated differential value dV/dt with the proper humidification range.

When the differential value dV/dt is within the proper humidification range, the CPU 62 determines in step S312 that the humidification of the electrolyte membranes 32 is proper (proper humidification) . When the differential value dV/dt is equal to or less than the threshold γ, the CPU 62 determines in step S314 that the humidification of the electrolyte membranes 32 is insufficient (insufficient humidification). When the differential value dV/dt is equal to or greater than the threshold δ, the CPU 62 determines in step S316 that the humidification of the electrolyte membranes 32 is excessive (excess humidification). This routine then ends.

By executing the humidification condition determining routine illustrated in FIG. 5, the fuel cell system 20 is able to determine a humidification condition of the electrolyte membranes 32 based on the voltage V and the current I outputted by the fuel cell 30 when the amount of oxidative gas supplied to the fuel cell 30 is increased.

In the foregoing routine, the amount of fuel gas supplied to the fuel cell 30 maybe increased with increases in the amount of oxidative gas supplied to the fuel cell 30.

Figure 6:
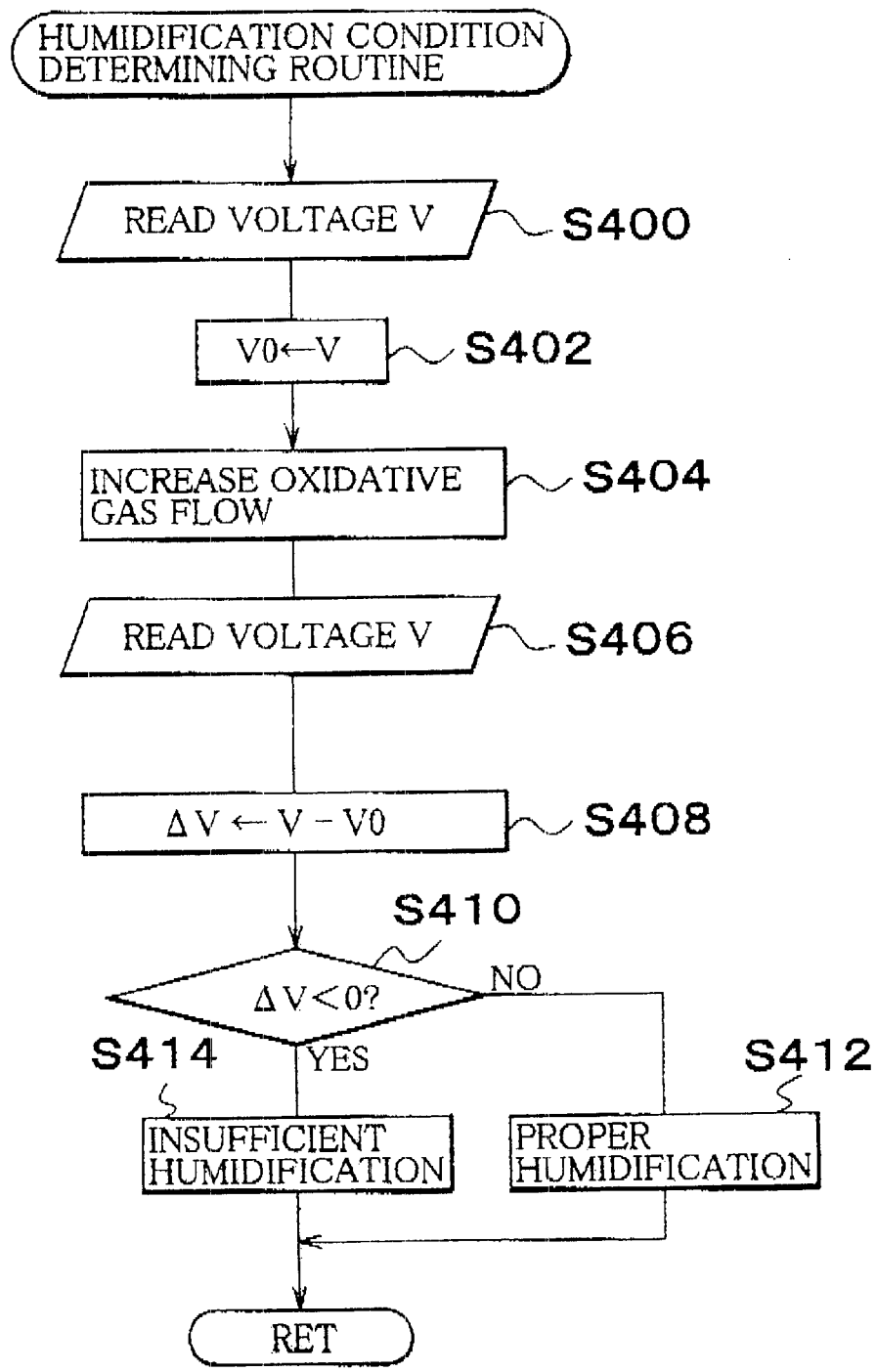
FIG. 6 is a flowchart illustrating still another humidification condition determining routine.

Next described will be a humidification condition determining routine illustrated in FIG. 6. When this routine is started, the CPU 62 first reads a voltage V detected by the voltmeter 40 in step S400. Subsequently in step S402, the CPU 62 substitutes the read voltage V for the previous voltage V0. After increasing the amount of oxidative gas supplied to the fuel cell 30 in step S404, the CPU 62 reads a voltage V again in step S406. Subsequently in step S408, the CPU 62 calculates a voltage deviation ΔV by subtracting the previous V0 from the read voltage V.

Subsequently in step S410, the CPU 62 checks whether the voltage deviation ΔV is a negative value. When the amount of oxidative gas supplied to the fuel cell 30 is increased, the water evaporation from the electrolyte membranes 32 accelerates. However, if the electrolyte membranes 32 are properly humidified, acceleration of the evaporation from the electrolyte membranes 32 up to a certain extent does not significantly change the voltage V outputted from the fuel cell 30. If it is found in step S410 that the voltage deviation ΔV is equal to or greater than "0", the CPU 62 determines in step S412 that the humidification of the electrolyte membranes 32 is proper (proper humidification). If the electrolyte membranes 32 are insufficiently humidified, an increase in the amount of oxidative gas supplied to the fuel cell 30 exacerbates the insufficiency in the humidification of the electrolyte membranes 32, so that the voltage V outputted from the fuel cell 30 decreases even further. Therefore, if it is found in step S410 that the voltage deviation ΔV is less than "0", the CPU 62 determines in step S414 that the humidification of the electrolyte membranes 32 is insufficient (insufficient humidification). The routine then ends.

By executing the humidification condition determining routine illustrated in FIG. 6, the CPU 62 is able to determine a condition of humidification of the electrolyte membranes 32 based on the voltage V outputted from the fuel cell 30 when the amount of oxidative gas supplied to the fuel cell 30 is increased.

Although only the amount of oxidative gas supplied to the fuel cell 30 is increased in the humidification condition determining routine illustrated in FIG. 6, it is also possible to increase the amount of fuel gas supplied to the fuel cell 30 with an increase in the amount of oxidative gas supplied to the fuel cell 30.

Figure 7:
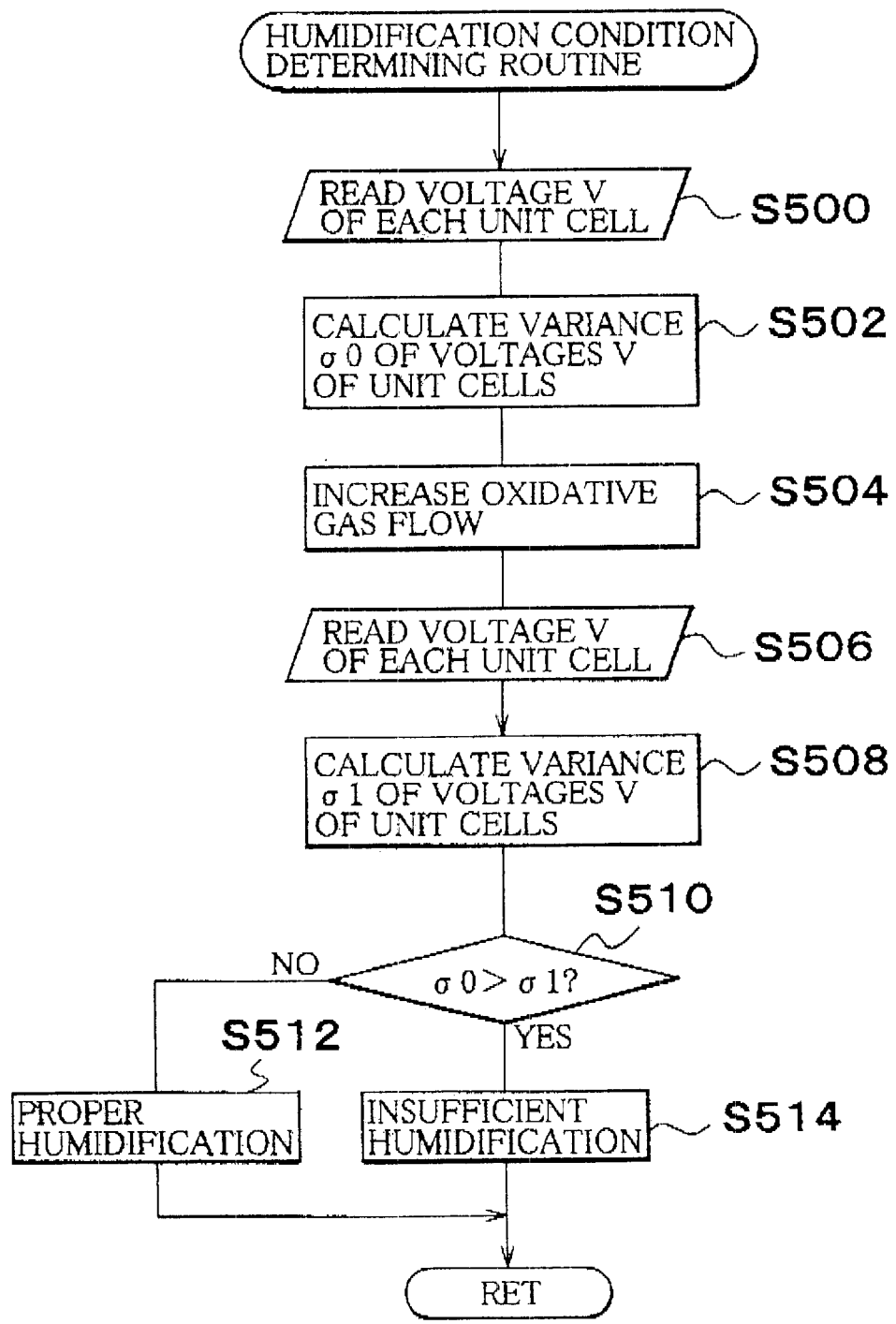
FIG. 7 is a flowchart illustrating a further humidification condition determining routine.

Next described will be a humidification condition determining routine illustrated in FIG. 7. In order to execute this routine, the voltmeter 40 of the fuel cell 30 needs to detect the voltage of each unit cell 31. The below description will be made, assuming that the voltmeter 40 detects the voltage V of each unit cell 31 of the fuel cell 30.

When the routine illustrated in FIG. 7 is started, the CPU 62 first reads the voltage V of each unit cell 31 of the fuel cell 30 detected by the voltmeter 40 in step S500. Subsequently in step S502, the CPU 62 calculates a variance σ0 of the read voltages V of the individual unit cells 31. After increasing the amount of oxidative gas supplied to the fuel cell 30 in step S504, the CPU 62 again reads the voltage V of each unit cell 31 detected by the voltmeter 40 in step S506. Subsequently in step S508, the CPU 62 calculates a variance σ1 of the read voltages V of the unit cells 31.

Subsequently in step S510, the CPU 62 compares the calculated variances σ0 and σ1. When the amount of oxidative as supplied to the fuel cell 30 is increased so as to accelerate water evaporation from the electrolyte membranes 32, the condition of the electrolyte membranes 32 changes from an excessively humidified condition toward a properly humidified condition, so that the variation (variance) of the voltages V of the unit cells 31 decreases. Therefore, if the variance σ0 is equal to or less than the variance σ1, the CPU 62 determines in step S512 that the electrolyte membranes 32 are properly humidified (proper humidification). If the variance σ0 is greater than the variance σ1, the CPU 62 determines in step S514 that the electrolyte membranes 32 are excessively humidified (excess humidification). The routine then ends.

By executing the humidification condition determining routine illustrated in FIG. 7, the CPU 62 is able to determine a condition of humidification of the electrolyte membranes 32 based on the variation of the voltages V of the individual unit cells 31 of the fuel cell 30 occurring before and after an increase in the amount of oxidative gas supplied to the fuel cell 30.

In the above-described routine, the amount of fuel gas supplied to the fuel cell 30 may also be increased with an increase in the amount of oxidative gas supplied to the fuel cell 30.

Furthermore, if the above-described routine is applied to a fuel cell system including a plurality of modules each of which is formed by a plurality of unit cells, it is also possible to determine a condition of humidification of the electrolyte membranes 32 based on the variation (variance) of the voltages outputted by the individual modules.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A fuel cell system comprising:
    a polymer electrolyte type fuel cell formed by stacking unit cells, each of which has an electrolyte membrane sandwiched by two electrodes;
    a fuel gas supply device connected to the fuel cell;
    a fuel gas humidifier;
    a fuel cell output electric current detector;
    a fuel cell resistance detector; and
    a humidification condition determiner that determines a condition of humidification of the electrolyte membranes based on the current detected by the current detector and the resistance detected by the resistance detector, wherein the humidification condition determiner determines a condition of humidification of the electrolyte membranes based on an over-time change in the resistance detected by the resistance detector when the current detected by the current detector is equal to a predetermined value.

2. A fuel cell system according to claim 1, wherein if the over-time change in the resistance is equal to or less than a first predetermined value, the humidification condition determiner determines that the electrolyte membranes are insufficiently humidified, and wherein if the over-time change in the resistance is equal to or greater than a second predetermined value that is greater than the first predetermined value, the humidification condition determiner determines that the electrolyte membranes are excessively humidified.

3. A fuel cell system comprising:
    a polymer electrolyte type fuel cell formed by stacking unit cells, each of which has an electrolyte membrane sandwiched by two electrodes;
    a fuel gas supply device connected to the fuel cell;
    a fuel gas humidifier;
    a fuel cell output electric current detector;
    a fuel cell resistance detector; and
    a humidification condition determiner that determines a condition of humidification of the electrolyte membranes based on the current detected by the current detector and the resistance detected by the resistance detector, further comprising a humidification controller that controls humidification in the fuel gas caused by the fuel gas humidifier, based on determination made by the humidification condition determiner.

4. A fuel cell system according to claim 3, wherein the humidification controller increases the humidification in the fuel gas if the humidification condition determiner determines that the electrolyte membranes are insufficiently humidified.

5. A fuel cell system according to claim 3, wherein the humidification controller increases a pressure of the fuel gas in the fuel cell if the humidification condition determiner determines that the electrolyte membranes are insufficiently humidified.

6. A fuel cell system according to claim 3, wherein the humidification controller decreases an operating temperature of the fuel cell if the humidification condition determiner determines that the electrolyte membranes are insufficiently humidified.

7. A fuel cell system according to claim 3, wherein the humidification controller decreases an amount of the fuel gas supplied by the fuel gas supplier if the humidification condition determiner determines that the electrolyte membranes are insufficiently humidified.

8. A fuel cell system according to claim 3, wherein the humidification controller decreases the humidification in the fuel gas if the humidification condition determiner determines that the electrolyte membranes are excessively humidified.

9. A fuel cell system according to claim 3, wherein the humidification controller decreases a pressure of the fuel gas in the fuel cell if the humidification condition determiner determines that the electrolyte membranes are excessively humidified.

10. A fuel cell system according to claim 3, wherein the humidification controller increases an operating temperature of the fuel cell if the humidification condition determiner determines that the electrolyte membranes are excessively humidified.

11. A fuel cell system according to claim 3, wherein the humidification controller increases an amount of the fuel gas supplied by the fuel gas supplier if the humidification condition determiner determines that the electrolyte membranes are excessively humidified.

12. A fuel cell system according to claim 3, further comprising an abnormality detector that detects an abnormality of the fuel cell system when the determination made by the humidification condition determiner remains unchanged after control by the humidification controller has been performed for a predetermined amount of time.

13. A fuel cell system according to claim 12, further comprising a detected abnormality information outputter.

14. A fuel cell system according to claim 12, further comprising a device that stops an operation of the fuel cell system when the abnormality detector detects the abnormality.

* * * * *